United States Patent [19]

Lange et al.

[11] Patent Number: 5,188,780
[45] Date of Patent: Feb. 23, 1993

[54] METHOD FOR PREPARATION OF DENSE CERAMIC PRODUCTS

[75] Inventors: Frederick F. Lange, Santa Barbara, Calif.; Bhaskar V. Velamakanni, Woodbury, Minn.

[73] Assignee: Regents of the University of California, Oakland, Calif.

[21] Appl. No.: 687,251

[22] Filed: Apr. 18, 1991

[51] Int. Cl.$^5$ .................................... C04B 35/64
[52] U.S. Cl. ........................... 264/63; 264/56; 264/311; 501/1
[58] Field of Search .............. 264/63, 311, 56; 501/1

[56] References Cited

U.S. PATENT DOCUMENTS

| | | | |
|---|---|---|---|
| 3,888,662 | 6/1975 | Boeckeler | 264/63 |
| 4,569,920 | 2/1986 | Smith-Johannsen | 501/1 |
| 4,624,808 | 11/1986 | Lange | 264/56 |
| 4,800,051 | 1/1989 | Yan | 264/56 |

OTHER PUBLICATIONS

Pashley, DLVO and Hydration Forces between Mica Surfaces in Li+, Na+, K+, Cs+ Electrolyte Solutions: A Correlation of Double-Layer and Hydration Forces with Surface Cation Exchange Properties J. of Colloid Interfaxe Science, vol. 83, No. 2, 531-546, Oct. 1981.
James, Characterization of Colloids in Aqueous Systems, Advances in Ceramics, vol. 21, 349-409, Ceramic Powder Science, 1987.
Lange, Powder Processing Science and Technology for Increased Reliability, J. Amer. Ceram. Soc., 72, [1], 3-15, (1989).
Horn, Surface Forces and Their Action in Ceramic Materials, J. Am. Ceram. Soc., 73 [5], 1117-1135 (1990).

Primary Examiner—James Derrington
Attorney, Agent, or Firm—Robbins, Dalgarn, Berliner & Carson

[57] ABSTRACT

A method of preparing dense ceramic product is described, wherein a coagulated network of ceramic powder particles in water is formed and then treated to increase the volume fraction of particles, thereby forming a water-saturated powder compact. The compact is formed into a desired shape and fired to provide the dense ceramic product. A coagulated network may advantageously be formed by mixing a ceramic powder with water at a pH that produces a net surface charge, to form a dispersed slurry and adding a sufficient amount of salt to the dispersed slurry to cause particles within the slurry to form the coagulated network. In view of the unique rheological properties of the powder compacts prepared from coagulated networks of ceramic powder particles, the compact may be processed into complex, near-net-shaped forms by introducing the compact into a mold and subjecting the mold to vibration, whereby the compact adopts the shape of the mold; once removed from the mold, the compact retains its shape without distortion.

17 Claims, 2 Drawing Sheets

Coagulated

Weakly attractive. non-touching network

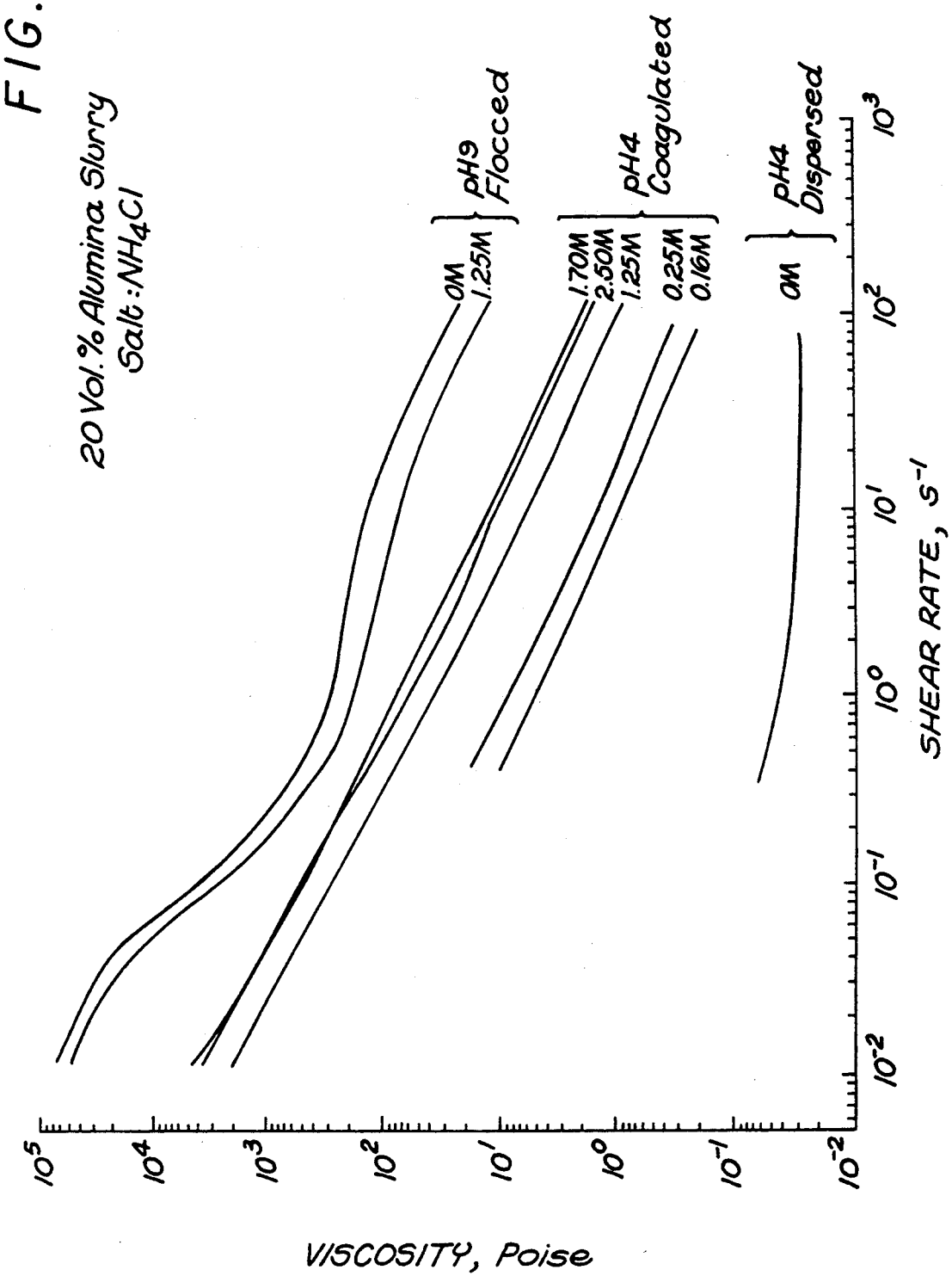

METHOD FOR PREPARATION OF DENSE CERAMIC PRODUCTS

This invention was made with Government support under Grant (or Contract) No. N00014-90-J-1441, awarded by the Office of Naval Research. The Government has certain rights in this invention.

BACKGROUND OF THE INVENTION

The present invention relates to methods for preparation of ceramic products. In particular, the present invention relates to methods wherein compositions comprising ceramic powders are formed into a desired shape and fired to prepare the final densified product.

Current processing methods generally employ ceramics particulates dispersed in a suitable medium with volume fractions of solids close to or below the powder's maximum packing fraction. Techniques such as injection molding have found application for heat engine components (turbine rotors, stators, vanes, transition ducts, back-shrouds, etc). Other common techniques, such as tape casting and plastic extrusion, are also being used to prepare products such as electronic packaging.

Despite their widespread applications, these known techniques have significant limitations. In particular, with the exception of injection molding, the known techniques are generally not adequate to permit the preparation of ceramic products having complex shapes.

Most advanced ceramics are formed as powder compacts that are made dense by a heat treatment. Injection molding suffers from the large (between 35 and 50 volume-%) polymer content that must be slowly removed prior to high-temperature processing. Typical industrial practices for making complex-shaped ceramics have used organic liquids for dispersing fine ceramic particulates with polymeric binders and plasticizers (which may comprise as much as 50 vol. %) for easy forming and handling. Environmental restrictions and economic concerns strongly encourage the development of alternative processing methods which do not employ organic solvents or polymeric additives. In addition to their potential for toxicity, the polymeric binders and plasticizers used in injection molding pose several processing problems with respect to incomplete binder burn out (resulting in residual impurities and defects) and excessive burn out time (about 40 to 50 hrs/cc). During the removal of additives, the ceramics may undergo substantial shrinkage and distort from their desired shape. In addition, impurities left behind after binder burnout (which is often incomplete) may severely limit the mechanical properties of the ceramic. Accordingly, there is a need in the art for methods to prepare densely-packed compositions consisting essentially only of ceramic powders so as to obviate the serious problems associated with binders and plasticizers.

Powder processing involves four basic steps: (1) powder manufacture; (2) powder preparation for consolidation; (3) consolidation to an engineering shape; and (4) densification and microstructural development to eliminate void space and produce the microstructure that optimizes properties. Each step has the potential for introducing detrimental heterogeneities that either persist during further processing or develop into new heterogeneities during densification and microstructural development. Many microstructure heterogeneities stem from the powder itself; agglomerates are a major heterogeneity in powders, as are inorganic and organic inclusions. Heterogeneities are responsible for both dielectric and mechanical breakdown; with respect to the latter, each heterogeneity is a stress concentrator, and thus a potential flaw which can initiate failure prematurely. Current processing methods inherently lack a clear approach for controlling microstructure heterogeneities and uncontrolled phase distributions. Therefore, there is also a need in the art for methods which optimize processing reliability by minimizing heterogeneities and uncontrolled phase distributions.

In the search for approaches to improve known methods for preparation of ceramic products, significant consideration has been given to the nature of the interaction between ceramic powder particles suspended in a liquid medium. This interaction has generally been considered to consist primarily of electrostatic interparticle repulsive forces and van der Waals attractive forces [see generally, R. O. James, "Characterization of Colloids in Aqueous Systems," *Advances in Ceramics*, Vol. 21, pp. 349-410 (1987)]. Van der Waals interparticle potentials are always attractive between like particles. In the absence of any repulsive potential, the van der Waals potential produces very strong, attractive interparticle forces at small (<5nm) interparticle separations. In this situation, particles which are initially separated and free to move are attracted to one another and quickly attach to first form small, low density clusters. This cohesive, touching network (a flocced network as schematically illustrated in FIG. 1a) requires great effort to break apart. Moreover, particles colliding with nascent agglomerates as are formed in such a flocced network are unlikely to become associated with the agglomerates at precisely the position required for formation of a close-packed configuration. Therefore, the attractive forces which created flocculation tend to prevent the achievement of the densest possible packing of powder particles.

To avoid flocculation, repulsive interparticle potentials sufficient to overcome the attractive van der Waals potential must be introduced. Long range, repulsive, electrostatic interparticle potentials are developed when a surface becomes charged. Charged oxide surfaces can be produced in water when the surface reacts with either $H_3O^+$ or $OH^-$ ions. By controlling the pH, a net surface charge is developed which is positive (acidic conditions), neutral, or negative (basic conditions). The pH producing the maximum surface charge (either positive or negative) depends on the surface chemistry and its equilibrium with $H_3O^+$ or $OH^-$. The surface is neutral at an intermediate pH, where the surface contains equal proportions of positive and negative sites, as well as neutral sites. Some of the ions in the solution with an opposite charge relative to the surface (known as counterions) are attracted by the surface to form a diffuse layer. Counterions do not chemically bond to the surface, but hover in solution near the surface in an attempt to shield the surface charge. For a given surface chemistry, the magnitude of the repulsive electrostatic potential depends on the magnitude of the surface charge obtained at a certain pH and on the concentration of counterions.

The DLVO theory, well known to the colloid chemist, adds the van der Waals attractive potential and the repulsive electrostatic potential to produce a combined interparticle potential that can either be repulsive or attractive, depending on the magnitude of the repulsive potential [see generally, Horn, Roger G., "Surface Forces and Their Action in Ceramic Materials," J. Am. Ceram. Soc. 73(5):1117 (1990)]. One form of a combined interactive potential (high surface charge and low salt content) is shown in FIG. 1b. For this condition, as particles approach one another, they encounter a repulsive energy barrier. The particles repel one another if the energy barrier is greater than their kinetic energy. When the volume fraction of particles is increased sufficiently such that they crowd together, the particles attempt to 'sit' at positions that minimize their interaction potential, viz., at a separation distance (usually > 20 nm) to form a non-touching, but interactive network schematically shown in FIG. 1b. As the particles are not touching one another, this is called a 'dispersed' network.

If the repulsive component of this combined potential is reduced (e.g., by decreasing the surface charge through a change in pH), a condition can be achieved where the repulsive barrier is no longer sufficient to prevent particles from slipping into the deep potential well caused by the van der Waals attractive potential so as to produce the strongly cohesive, touching network described above. According to the DLVO theory, particles should always fall into a deep potential well to form a cohesive flocced network when conditions are much less than optimum, even though the combined repulsive interaction (magnitude of the repulsive barrier and equilibrium separation distance) may be controlled and optimized by, e.g., controlling pH. DLVO theory thus offers no help in understanding whether or how one might control the depth of the attractive well.

It is an object of the present invention to provide techniques for preparing ceramic products from particles which have been as densely packed as possible, using a minimum amount of non-ceramic additives (such as binders and plasticizers).

It is a further object of the present invention to provide manufacturing technology capable of producing high-volume, near-net-shape powder compacts that can be subsequently densified by heat treatment.

It is an additional object of the present invention to provide methods which permit the formation of complex shapes during initial stages of processing that are within a tolerance envelop of the desired shapes after the final stages of processing, such that any shrinkage associated with densification might change the dimensions but not the shape of the final product.

It is yet another object of the present invention to provide fabrication methods for preparation of dense, complex-shaped ceramic products, which methods are simple and inexpensive to use, yet able to handle complex shapes.

SUMMARY OF THE INVENTION

Pursuant to the present invention, complex and near-net-shaped ceramic powder compacts are formed using a technique which involves forming a liquid saturated powder compact, consolidating the compact (for example, by pressure filtration or centrifugation), and shaping the compact to the desired dimensions. To prepare the shaped body, the compact may advantageously be introduced into a suitably-shaped mold cavity and vibrated gently. During vibration, the liquid saturated powder compact becomes sufficiently fluid to fill the cavity. After the vibration is stopped, however, the powder compact (now having the shape of the cavity) becomes sufficiently stiff to retain its shape without distortion. The unique rheology of the powder compact is produced in accordance with the invention by manipulating interparticle forces of the ceramic powder to develop a weakly attractive particle network, with properties distinct from either the flocced networks or the dispersed networks predicted by DLVO theory.

BRIEF DESCRIPTION OF THE DRAWINGS

The invention may be better understood with reference to the accompanying drawings, in which:

FIG. 2 is a graph showing the viscosity vs shear rate for a series of aqueous slurries containing 20 volume % of an aluminum oxide powder.

DETAILED DESCRIPTION OF THE INVENTION

Figure 1A:
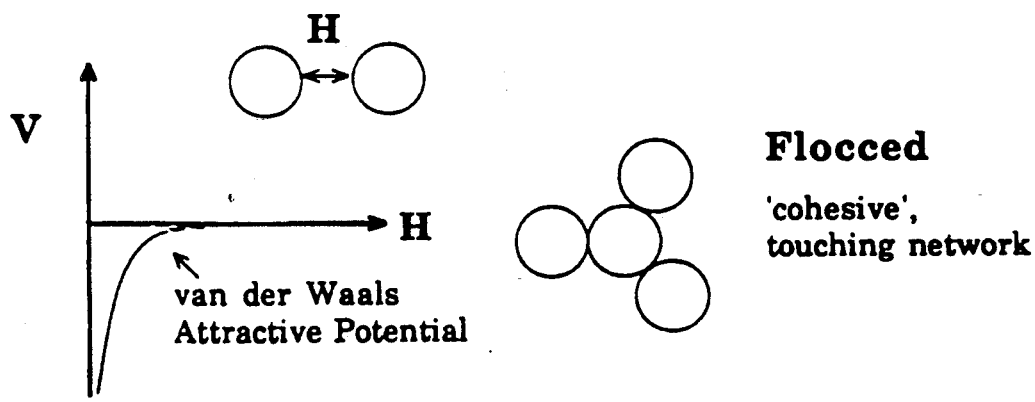
FIGS. 1a–1c are schematic representations of flocced, dispersed and coagulated networks, respectively.

In accordance with the present invention, short-range surface repulsive forces which may be introduced on highly charged ceramic particles in aqueous media are used to provide a lubricating effect between particles. Due to such lubrication effects, the ceramic particles in the slurry may be packed to a density which could not heretofore be achieved due to the formation of cohesive, flocced networks. Therefore, by exploitation of the lubrication effects, a maximum particle packing density is obtained when the slurry is formed into a consolidated body, for example by pressure filtration or centrifugation.

The saturated consolidated body exhibits plastic flow behavior similar to that heretofore observed only for some types of clay bodies. The consolidated bodies prepared in accordance with the present invention, exhibiting plasticity and a very high particle packing density, can be made to flow and fill even a complex-shaped die cavity simply by placing the saturated powder compact in the cavity and subjecting the material to vibration (for example, by shaking). Little effort is generally required to form complex-shaped molded products; moreover, the thus-formed products tend to maintain their complex shapes even after removal from the mold. After drying, the products may be densified by a conventional high temperature heat treatment. Unlike the heretofore known materials, the near-net-shaped compacts retain their molded shape upon densification, with substantially uniform shrinkage.

The weakly attractive interparticle forces are produced by a combination of the longer range, electrostatic repulsive forces and attractive van der Waals forces contemplated according to DLVO theory with a third type of very short range ($\leq 5$ nm), repulsive hydration forces. These short range, repulsive hydration forces prevent the attractive particles from touching one another. Accordingly, under appropriate conditions these forces allow particles to slide pass one another easily and pack to a higher density during consolidation than would otherwise be the case either with dry solid particles or with touching particle networks. This third, repulsive potential only acts when the separation distance between the surfaces is very small (i.e., less than about 5 nm), where the attractive van der Waals potential becomes strong.

The formation and properties of hydration layers in solutions of plate-like clay particles is known, and the influence of hydration layers on interactions between molecularly smooth mica surfaces has been reported [Pashley, R. M., "DLVO and Hydration Forces between Mica Surfaces in $Li^+$, $Na^+$, $K^+$, and $Cs^+$ Electrolyte Solutions: A Correlation of Double-Layer and Hydration Forces with Surface Cation Exchange Properties," *J. Colloid and Interface Science* 83(2):531–546 (1981)]. It has now unexpectedly been found that this hydration layer repulsion phenomenon is not limited to situations where plate-like surfaces (as are found with clay particles) exhibit surface-charging behavior.

In experiments with $Al_2O_3$ powders, salt was added to an aqueous $Al_2O_3$ slurry prepared at a pH known to produce a positive surface charge and a highly dispersed particle network. Hydrated anions were attracted to the positively charged $Al_2O_3$ surface. When sufficient salt was added to the slurry it was noted that the dispersed network was altered to what superficially appeared as a flocced network predicted by the DLVO theory. After further experiments, it was concluded that the salt did change the dispersed network to an attractive network, but that this new attractive network was not cohesive. That is, unlike a flocced network, the particles in this network could easily be rearranged.

Figure 1B:
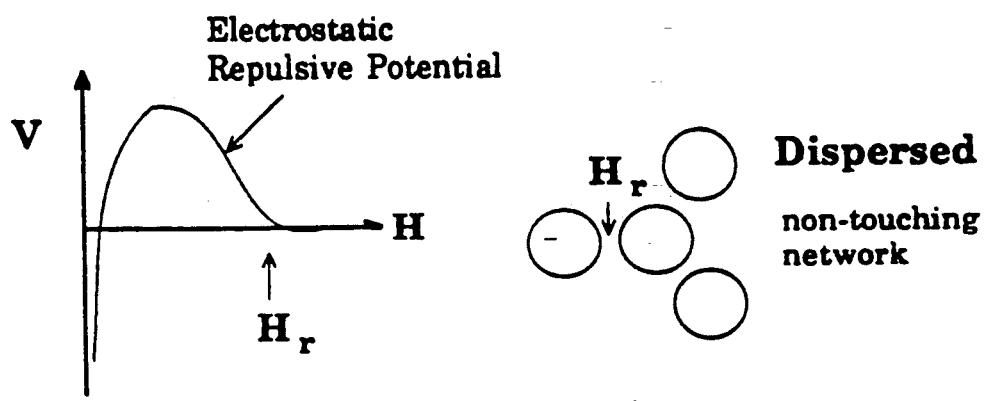
Figure 1C:
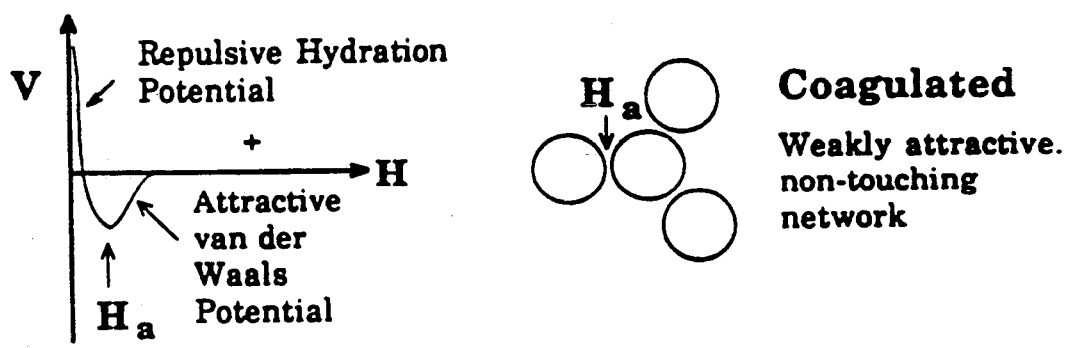

Additions of more counterions continuously reduced the electrostatic repulsive potential. This dispersed particle network became an attractive network above an optimal concentration of counterions due to the persistent van der Waals potential. As the hydrated counterions reduced the electrostatic repulsive potential, they also appeared to form a hydrated surface layer; thus, they built a strong, short range repulsive hydration potential. Instead of falling into the deep potential well to produce a cohesive, touching network predicted by DLVO theory, the particles slipped into a well with a more modest depth to produce an attractive, but non-touching, particle network called a "coagulated" network (as schematically illustrated in FIG. 1c).

In accordance with preferred embodiments of the present invention, coagulated ceramic particle networks are formed by adjustment of the pH of a dispersed slurry of the particles and of the amount of salt added to the slurry. This in turn controls the residual long range electrostatic repulsive potential, and possibly the strength of the short range repulsive hydration potential as well. No additional effects are observed when the salt concentration is greater than an optimal value (i.e., an amount of salt which reduces the long-range electrostatic repulsive potential to zero). This suggests that hydrated counterions are no longer attracted to the surface, all of the electrostatic repulsive potential is dissipated, and the system resides in the deepest potential well that can be established when the repulsive hydration potential is summed with only the attractive van der Waals potential. This state appears to produce the strongest, non-touching coagulated particle network, but a much weaker network relative to the flocced network.

The particular salt or salts employed is not critical to the present invention; a wide variety of organic and inorganic salts would in principle be useful in developing a coagulated particle network due to the short range repulsive potential of the charged ceramic particles. Depending upon the composition of the specific ceramic particles, however, in certain instances particular types of salts might be inappropriate by virtue of the possibility that the salts would react with the ceramic particles, and such salts would therefore be avoided in those instances. Otherwise, the choice of salt would readily be made by one familiar with the nature and properties of the ceramic powder. Inorganic salts, such as NaCl, $NH_4Cl$, NaI, etc., are suitable for use with most ceramic powders and are considered in detail in the accompanying examples.

In accordance with a preferred embodiment of the present invention, a water saturated powder compact containing a weakly attractive particle network for use in accordance with the inventive method may be produced by the following sequence of operations: (1) forming a dispersed slurry (i.e., a mixture of powder and liquid) by mixing a ceramic powder (generally comprising less than 30 volume % powder) with water at a pH that produces a net surface charge and a highly repulsive interparticle force; (2) adding a sufficient amount of a salt to the dispersed slurry to cause particles within the slurry to attract one another; and (3) increasing the volume fraction of particles (by, e.g., pressure filtration or centrifugation) to form a water saturated powder compact with a uniform and very high particle packing density. The coagulated slurry has a higher viscosity at a given volume fraction of powder relative to a dispersed slurry. Thus, if the volume fraction of powder were too high in the coagulated slurry (i.e., substantially greater than about 30 volume %), its rheology would be that of a paste, rather than a flowable slurry suitable for pouring and further processing (e.g., pressure filtration or centrifugation). After consolidation, the attractive forces between particles within the powder compact saturated with water are sufficiently strong to prevent body flow, but sufficiently weak to produce flow when the body is subjected to a modest vibration. The compact is then formed into a desired shape and fired to provide the final ceramic product.

The implications of the particle networks have direct bearing on the particle packing density as well as on the rheology of pressure-consolidated particulate bodies and on processing ceramics and their composites. Fig. 2 shows the viscosity vs shear rate for a series of aqueous slurries containing 20 volume % of an aluminum oxide powder. The viscosity of the dispersed slurry (prepared at pH =4, without added salt) is low and relatively independent of shear rate; it represents the behavior of a highly repulsive particle network (FIG. 1b). The viscosity of the flocced slurry (pH=9, with and without salt additions) is highest relative to other slurries and exhibits extensive shear thinning indicative of a strongly cohesive, touching particle network (FIG. 1a). The influence of salt ($NH_4Cl$) additions on the viscosity of dispersed 20 volume % alumina slurries (at pH=4) is shown by a series of curves between the curves for the dispersed and flocced slurries. As shown, the added salt increases the viscosity of the slurry and produces shear thinning behavior indicative of a weekly attractive, non-touching, coagulated network (FIG. 1c).

The behavior of the coagulated slurries was dependent on $NH_4Cl$ concentration, i.e., their viscosity at any shear rate increased over four orders of magnitude. No further changes in viscosity were observed when the salt concentration exceeded a saturation maximum of 1.7 M $NH_4Cl$, which is the maximum practical value of added salt for this system. While the degree (slope of the viscosity vs shear rate curve) of shear thinning is similar to that of flocced slurries, the magnitude of the viscosity at any shear rate depended on the amount of added salt. At a salt content greater than or equal to the saturation maximum (which, in this case, is also the maximum practical salt concentration), the viscosity of the coagulated slurries is about one order of magnitude lower than that for the flocced slurries. This behavior suggests that a similar attractive network exists within both the coagulated and flocced slurries, but that the magnitude of interparticle attraction is altered by the salt concentration.

As shown in FIG. 1c, the particles in coagulated slurries are weakly held together in a shallow "hydration minimum". The depth of the hydration minimum controls the strength of the attractive but non-touching particle network in the coagulated slurries. The data shown in FIG. 2 strongly suggests that the attractive particle network becomes stronger with added salt, but never as strong as the flocced network.

In accordance with preferred embodiments of the present invention, the addition of appropriate amounts and types of salts is employed to decrease the magnitude of the long range electrostatic repulsive force. Powders that react with acidic or basic water are positively charged on the acidic side (i.e., at low pH) and negatively charged on the basic side (at high pH). Depending on the surface chemistry of a given powder, at a particular pH the particles are neutral (i.e., the number of positive surface sites equals the number of negative sites). This pH is defined as the point of zero charge (PZC). One may determine the PZC, and thus the pH that separates positively from negatively charged surfaces, by a variety of known techniques. Using electrophoretic techniques, for example, the slurry is placed between a potential gradient and the particle velocity is determined. For alumina, the PZC is about pH 9; for silica, about pH 4. For silicon nitride, the PZC is between about pH 4 (if the surface is highly oxidized to resemble silica) and about pH 7 (for a less oxidized surface).

The pH range to which the powder is appropriately brought before adding the salt is variable, and is determined relative to the PZC for that powder. Preferably, the pH is as close as possible to the value(s) where the surface charge may be brought to the maximum (i.e., a pH at an optimum variance from the PZC). For example, for alumina powder an optimum pH is between about 2 and 4; this range produces the largest positively-charged surface, and thus the largest interfacial potential difference (zeta potential). For other powders, the optimum pH range for formation of a coagulated network may be determined in a manner known per se using, e.g., electrophoretic measurements which define the zeta potential vs. pH.

Up to a particular salt concentration for each ceramic particle system, increasing additions of salt increase the magnitude of the attractive interparticle forces. Determination of an effective salt concentration range for use with any given ceramic powder material may be carried out empirically in a manner known per se by those skilled in the art of colloid chemistry. The desired coagulated network can be formed within a range of added salt concentrations; for example, with alumina powder, it may range between about 0.1 and about 1.7M NH$_4$Cl. Any concentration within this range would be a sufficient amount of added salt to form a coagulated network. As shown in FIG. 2, the amount of salt added within this range only changes the strength of the coagulated network; the method of the invention may be carried out with any network strength, as long as the desired coagulated network is formed.

Determination of the minimum amount of salt necessary to just produce an attractive particle network may be determined for any given powder by first producing a dispersed slurry at the appropriate pH and then adding small, known increments of salt until the particles within the slurry attract one another. In dilute slurries (for example, those containing less than about 1 to 3 volume-% of powder), the formation of an attractive network may be monitored visually; groups of particles come together to form noticeable agglomerates, changing the texture of the slurry.

Alternatively, the minimum amount of salt necessary to form an attractive particle network may be determined using sedimentation columns. Slurries containing different salt contents are allowed to sediment in columns for several hours. The slurry with the minimum salt content that develops a clear supernatant defines the minimum salt content necessary for attractive network formation. This concentration is known as the critical coagulation concentration.

The maximum practical value of salt content (i.e., the salt concentration above which further additions of salt have no effect on network strength) is determined through viscosity versus shear rate measurements, as are shown in FIG. 2. Above the maximum practical salt concentration, there is no observed change in viscosity. At or near the maximum practical concentration, there is achieved an interparticle network of maximum strength. For purposes of the present invention, however, it is not essential that the strongest interparticle network be formed.

Slurries used to form the saturated powder compacts used in this method exhibit extensive shear thinning behavior, i.e., they decrease their viscosity by more than three orders of magnitude with increasing shear rate. The saturated powder compacts used in the inventive method of forming complex-shaped articles themselves exhibit extensive shear rate thinning. This allows the compact to behave in a sufficiently liquid-like manner when vibrated to fill a complex mold cavity, but allows the newly-shaped article to retain its shape once the vibration is stopped. It is development of the coagulated network (the particles are weakly attractive but non-touching due to short range repulsive forces) which imparts to both the slurry and the saturated powder compact derived therefrom the characteristic rheological properties exploited in accordance with the present invention. Both the slurry and the particle compact behave in a manner heretofore observed only with materials like clay; while clay materials appear to develop their short range repulsive potential naturally, it has heretofore not been observed and would not have been expected that ceramic powders could be manipulated in a manner such that materials with such properties could be prepared therefrom.

Colloidal powder treatments (sedimentation and/or filtration) can be used to eliminate many heterogeneities common to powders and ensure more uniform phase distribution. This permits the preparation of ceramics of enhanced uniformity and with greater reliability. In addition, this method is not only extremely simple, inexpensive and safe but also avoids the use of organic solvents, polymeric binders and plasticizers.

To consolidate particles into saturated powder compacts, the volume fraction of particles within a slurry is increased by particle partitioning methods, such as pressure filtration and/or centrifugation. Increasing the volume fraction of particles also changes the slurry rheology. The highest volume fraction of particle that can be packed together for a given consolidation pressure will depend on the interparticle potential. The viscosity of the densely packed particle slurry is extremely high and it behaves much like a solid at slow shear rates. These densely packed slurries can thus be considered as saturated powder compacts. The rheology of the saturated powder compacts depends on the interparticle potential.

Pressure filtration is one suitable method for consolidating powders. A slurry (for example, alumina powder in water) confined within a cylinder is acted upon at one end by a plunger which forces the fluid within the slurry through a filter at the other end. Particles within the slurry are trapped at the filter to build up a consolidated layer as fluid is forced through the layer and then through the filter. Pressure filtration concentrates the particles within the slurry to form a layer consisting of densely packed particles. After a single layer of particles is trapped by the filter, the trapped particles themselves become part of the filter through which fluid must flow t trap more particles. The consolidated layer thickens in proportion to the amount of slurry filtered; consolidation stops when the top of the layer encounters the plunger. At this point, all of the particles which were initially in the slurry are densely packed within the consolidated body and any space left within the densely packed particles is filled with fluid. The consolidated body is then removed from the cylinder. Additional fluid can be removed by evaporative drying.

For powders comprising dense, spherical particles, pressure filtration studies have shown that interparticle forces have the greatest effect on particle packing density. Dispersed slurries (highly repulsive interparticle forces) produce much higher packing densities than flocced slurries (highly attractive interparticle forces); particularly high particle packing densities can be achieved pursuant to the present invention using coagulated slurries (short range hydration layer repulsion).

Centrifugation is another technique for fractionating colloidal slurries. Particles in a slurry are centrifuged into a mold, followed by decantation of the supernatant liquid and removal of the packed particulate body from the mold. The stress is applied to each element of the component rather than to its exterior. An obvious consideration is the effect of polydispersity in particle size, as sedimentation rates during centrifugal acceleration vary with particle size and density. The use of flocced or coagulated rather than dispersed particulate systems can overcome this difficulty, as a flocced or a coagulated system consolidates as a network rather than by motion of individual particles. Uniform packing densities in centrifuged particulate bodies can be also achieved by processing with concentrated dispersed slurries; however, as indicated above, processing with concentrated dispersed slurries is extremely complex. Centrifugation can be conveniently used to uniformly pack polydispersed particles from coagulated slurries without being concerned about mass segregation.

The influence of interparticle forces on the rheology of consolidated bodies has been characterized with the help of stress relaxation experiments. A fixed compressive strain was applied to saturated consolidated bodies made by pressure filtration and the accompanied stress relaxation as a function of time was recorded. The stress relaxation behavior is an indirect indication of the rheology of the consolidated bodies. As consolidated particulate bodies consisting of attractive forces tend to be solid-like or elastic, these bodies only relax to about 70% of the peak stress. However, consolidated bodies made from dispersed as well as coagulated slurries exhibit plastic behavior. The consolidated bodies made from coagulated slurries consistently appear to have better shape retention characteristics when compared to a body made from a dispersed slurry, because they exhibit a yield stress for plastic flow. An important characteristic of the bodies made from coagulated slurries is that the plastic flow behavior is retained when stored without moisture loss for as much as a week to ten days.

The inventive method is applicable to the preparation of complex shaped bodies from a wide variety of different ceramic powders. For purposes of the present invention, ceramic powders are contemplated as including all non-metallic, inorganic materials which may be formed into a desired shape and then treated (typically, by heating) to form a final ceramic product. As is well known in the art, this class of ceramic powders includes a wide variety of different classes of compounds, including in particular oxides, nitrides, borides, carbides and tellurides. For example, the following materials have all been used to prepare ceramic products: alumina, zirconia, titania, silica, lead oxide, silicon carbide, silicon nitride and yttria, as well as mixtures thereof. Further, powders containing more than one metal ion (e.g., binary and ternary compounds) are also clearly suitable for use in accordance with the present invention. In addition, while the materials are generally employed in a particulate form, for particular end uses it may be desirable to use these materials in alternative formulations as are well known in the art (such as disks, whiskers, etc.).

The following examples serve to illustrate various aspects of the present invention.

EXAMPLES

Example 1

Slurry Preparation

Aqueous slurries containing 20 vol. % α-alumina powder (0.4 μm median size) were used in this study. All the slurries were prepared by first dispersing the as-received powder in deionized water at pH4 without ionic strength adjustments. At pH4 (O M NH$_4$Cl) the zeta potential of alumina is sufficiently large to keep particles dispersed through strong electrostatic repulsion. A high shear-field, obtained by immersing an ultrasonic horn in the slurry, aided in breaking apart soft agglomerates. Finally, ionic strength and/or pH adjustments of slurries were made as required. Analytical grade HNO$_3$ and NH$_4$OH were used for pH adjustments; analytical grade NH$_4$Cl was used for ionic strength adjustments.

The following terminology is adopted to distinguish between the three types of alumina slurries that were used in this study: (1) slurries at pH 9 with and without NH$_4$Cl are "flocced"; (2) slurries at pH4 without NH$_4$Cl are "dispersed"; and (3) slurries at pH4 with NH$_4$Cl are "coagulated". In the present study, the ionic strength in coagulated slurries is adjusted to 1.5 M.

Consolidation

Pressure filtration was used to make consolidated ceramic bodies using the coagulated alumina slurry. A predetermined volume of slurry was poured into a cylindrical filtration die 2.54 cm in diameter to make consolidated bodies having a thickness of 1 to 1.5 cm once filtration was complete. A final consolidation pressure of 14.6 MPa was used in all the experiments. The alumina powder used in the present study could be packed to a maximum density of 0.62. After pressure filtering the coagulated slurry, the consolidation body was ejected from the die and was immediately transferred into a zip-lock plastic bag containing a moist paper towel and sealed to prevent the sample from drying. The presence of the moist towel was to ensure 100% humidity in the sealed bag so as to prevent the body from drying during storage.

Epoxy Mold Preparation

A tapered rotor shaped plastic male die (3 cm in diameter and 2.5 cm in height) was prepared using an epoxy mold containing the rotor-shaped cavity. The epoxy mold was prepared by the following procedure. The plastic die was initially coated with a silicone die release agent. Then the die was placed upright resting on its wide base in a paper cup. A sufficient amount of quick set epoxy resin was prepared and carefully pored over the plastic die in the cup. After allowing the assembly to set for 15 minutes, the die was separated from the epoxy resin. This procedure allowed making casting molds with excellent dimensional stability and surface smoothness. These molds were used subsequently for casting the plastic ceramic.

Ceramic Shape Forming

Prior to ceramic molding, the epoxy mold was given a thin coat of high vacuum silicone grease to allow the molded ceramic to be easily removed. The saturated powder compact (stored in a plastic bag) was then placed in the cavity of the mold. The mold containing the saturated powder compact was then caused to flow into every part and corner of the mold by gently tapping the mold on the table. This tapping produced sufficient vibrations to impart viscous flow to the plastic body, which facilitated filling every part of the mold. In addition to the plastic flow, during the course of tapping expulsion of air bubbles initially trapped between the plastic body and the mold walls was observed to have taken place. Once all the material is evenly distributed in the mold, the tapping was stopped and the saturated particulate body (along with the mold) was weighed. After 24 hours of air drying and 12 hours of oven drying at 60° C., the shaped body shrank (about 1%); this facilitated removal of the cast body without damage. Assuming that the body contained only alumina powder and water, the saturated packing density was again determined by weighing the body before and after drying. The shaped ceramic had a relative packing density of 62%, i.e., identical to the saturated powder compact body formed by pressure filtration.

Heat Treatment of the Ceramic

The dried ceramic particulate articles were first heat treated at 300° C. to sublime $NH_4Cl$ from the ceramic. Thereafter, the ceramic was densified at 1550° C. for 3 minutes. The densified alumina body had a relative density of 98% (i.e., 98% of the theoretical density of aluminum oxide).

Example 2

Attempts were also made to form a complex ceramic shape (e.g., a gear) using the procedure described in Example 1. Although the attempts were extremely successful with respect to making the epoxy mold, filling the mold with the saturated consolidated body (pH4, 1.5 M $NH_4Cl$), and drying the ceramic without cracking, the dried ceramic could not be removed from the mold without damage. Therefore, a second casting procedure was adopted, in which silicone rubber was substituted as the mold material. Once cured, silicone rubber exhibits some flexibility, yet it is rigid enough to be an ideal material for forming complex shapes.

Silicone Rubber Mold

Except for the different mold making material, for making a mold containing a gear-shaped cavity the procedure is similar to that of the epoxy mold preparation procedure described in Example 1. Dow Corning silicone rubber (3112 RTV) wa mixed thoroughly with 10 vol. Dow Corning catalyst (RTV 1) and then the mixture was degassed to expel any entrapped air. The mixture was then carefully poured over a greased metal gear. After 12 hours of curing at room temperature, the metal gear was removed from the hardened rubber cast by simply pushing the gear out of the mold.

Casting of the Ceramic Gear

Making of the saturated consolidated body, shaping it in silicone rubber mold, and drying the ceramic in the mold was done as per the procedure described in Example 1. Finally, the dried ceramic was ejected out of the mold with gentle squeezing. About 95% of the gear teeth remained unbroken. An optical micrograph comparison of the ceramic gear adjacent to the metal gear confirmed that the quality of gear reproduction as well as the surface reproduction was excellent, particularly in view of the small dimensions of the gear teeth (minimum width of 0.72 mm). This demonstrates that the present technique can be used for making complex shaped ceramic parts. Thorough coating of the rubber mold with silicone grease (stripping agent) prior to ceramic casting is observed to be a most important factor in producing a ceramic gear with all of its teeth remaining. The dried and sintered ceramic prepared in this manner showed remarkable reproduction of the original gear.

Example 3

Lubricating surface layers as formed on alumina particles in Examples 1 and 2 can also be introduced into other ceramic systems such as zirconia, titania, silica, silicon carbide, silicon nitride, etc. In the present example, surface hydration layers were introduced on zirconia containing 3 mole % yttria (Tosoh-Zirconia TZ-3Y, Minato-ku, Japan). A 10 vol. % zirconia was dispersed in water at pH 2.8 and equilibrated while the slurry was being ultrasonicated. Later, the surface lubricating layers were formed on zirconia by adding 1.5 $NH_4Cl$ and the pH readjusted to 2.8. The slurry was then pressure filtered, as per the procedure described in Example 1. The consolidated body was thereafter placed in the epoxy mold (consisting of a rotor-shaped cavity, as described in Example 1) and the entire assembly was tapped for the plastic consolidated body to flow into the mold. The shaped ceramic was allowed to dry in the mold; after drying, the relative particle packing density of the ceramic was 50%. The dried ceramic was ejected from the mold as per the procedure described in Example 1.

Example 4

All commercial submicron sized ceramic powders consist of heterogeneities such as coarse particles, hard agglomerates, organic and inorganic inclusions. Such heterogeneities, if not separated from powder prior to consolidation, can act as stress concentrators in the densified ceramic and can adversely affect the mechanical properties of the ceramic. It has been demonstrated that colloidal methods, i.e., methods of controlling and manipulating the forces between particles within a liquid, can be used to fractionate from powders heterogeneities (e.g., agglomerates and inclusions) that would otherwise lead to strength degrading flaw populations. That is, colloidal methods to treat powders have the potential to produce more reliable ceramic materials. Because drying can reintroduce heterogeneities, colloidally treated powders must be packed into a shape from their slurry state. High particle packing densifies the powder compact. In addition, mass and/or phase segregation during consolidation must be avoided.

Preparation of Coagulated Ceramic Slurries Free of Heterogeneities

In both the traditional approach of powder fractionation and the improved method suggested in the present disclosure, the first few steps of the process are essentially the same, i.e., (1) disperse ceramic powder in pure water at a pH where the interparticle interactions are predominately repulsive; (2) ultrasonicate the particulate slurry to break apart the soft agglomerates in the powder; (3) sediment the slurry for a given length of time to separate coarse particle, hard agglomerates and other impurities (for a given particle size the duration of sedimentation can be approximately estimated by Stokes' equation); and (4) carefully siphon the supernatant containing desired colloidal particles into a separate container.

In the traditional approach, the particles in the supernatant are flocced by adjusting the pH to the point of zero charge and allowing the flocced particles to sediment. Flocculation of the desired fraction of the powder in the supernatant serves two functions. First, it concentrates the slurry for downstream processing needs. Second, flocculation prevents segregation of coarse and fine particles during storage and handling. This step is followed by using the slurry for consolidation prior to which one may or may not disperse the slurry. Because of their strongly attractive particulate network, flocced slurries always pack to a lower density than the dispersed state. One may pack the particles to their highest density in the dispersed state in the absence of mass segregation.

Coagulation instead of flocculation offers an ideal and efficient alternative for colloidal fractionation and processing of ceramics powders. In an improved method of colloidal powder fractionation, a salt of known concentration is added to the supernatant containing the dispersed colloidal particles. The addition of the salt to the dispersed slurry destabilizes the particles, leading to coagulation. The coagulated particles sediment and the supernatant can be removed. The slurry containing the coagulated particles can be directly used in consolidation, since particles in the coagulated slurries pack to the maximum density.

The concentrated coagulated slurry can be used to make useful ceramic shapes following the procedure described in Example 1 or 2.

Example 5

Another potential advantage of colloidal methods, in addition to removal of heterogeneities, is its ability to mix two or more powders to produce more uniform multiphase ceramic bodies. This allows one to manufacture composite ceramics. The second phase material can be an alloying agent and/or a reinforcement (particle, whisker, fiber, disc etc.). Typical examples of the first kind of composite are $Al_2O_3$-$ZrO_2$, $Al_2O_3$-MgO, etc. Examples of the other kind of composite include $Al_2O_3$-SiC (whisker), $Si_3N_4$-SiC etc.

For making these composites, one either treats individual ceramic powders to fractionate heterogeneities (as per Example 4) followed by either mixing them together and then coagulating them or by mixing the coagulated slurries at a high shear rate sufficient to break apart the coagulated networks and form a new coagulated network containing both phases. When mixed in a slurry state, this type of multicomponent dispersions can be mixed thoroughly and uniformly. The composite coagulated slurry is transformed into useful ceramic components as per the procedure described in Example 1 and 2.

While the invention has been described with reference to exemplary embodiments thereof, it should be noted by those skilled in the art that the disclosures are exemplary only and that various other alternatives, adaptations and modifications may be made within the scope of the present invention. Accordingly, the present invention is not limited to the specific embodiments as illustrated herein, but only by the following claims.

What is claimed is:

1. A method of preparing a dense ceramic product, comprising:
   (1) forming a coagulated network of ceramic powder particles in water by adjustment of the pH of a dispersed slurry of said ceramic powder particles in water to a pH that produces a net surface charge and addition of a sufficient amount of a salt to the dispersed slurry to form said coagulated network;
   (2) treating said coagulated network of ceramic powder particles in water to increase the volume fraction of said powder particles, thereby forming a water saturated powder compact; and
   (3) firing the compact to provide said dense ceramic product.

2. A method according to claim 1, wherein the compact is formed into a desired shape prior to firing.

3. A method according to claim 2, wherein said desired shape is formed by introducing the compact into a mold and subjecting the mold to vibration sufficient to induce flow of the compact, whereby the compact adopts the shape of the mold.

4. A method according to claim 1, wherein said coagulated network is formed by:
   mixing a ceramic powder with water at a pH that produces a net surface charge, to form a dispersed slurry; and
   adding a sufficient amount of salt to the dispersed to cause particles within the slurry to form a coagulated network.

5. A method according to claim 1, wherein the dispersed slurry comprises less than about 30 volume % ceramic powder.

6. A method according to claim 1, wherein said salt is selected from the group consisting of organic salts, inorganic salts and mixtures thereof.

7. A method according to claim 6, wherein said salt is an inorganic salt.

8. A method according to claim 7, wherein said inorganic salt is selected from the group consisting of alkali halides, alkali earth halides, ammonium halides and mixtures thereof.

9. A method according to claim 1, wherein the ceramic powder is selected from the group consisting of oxides, nitrides, carbides, borides and tellurides.

10. A method according to claim 9, wherein the ceramic powder is selected from the group consisting of alumina, zirconia, titania, silica, silicon carbide, silicon nitride, yttria, lead oxide and mixtures thereof.

11. A method according to claim 1, wherein the volume fraction of particles is increased by pressure filtration.

12. A method according to claim 1, wherein the volume fraction of particles is increased by centrifugation.

13. A method according to claim 1, wherein said firing comprises a first heating step at a first temperature sufficient to evaporate water and pyrolyze salt from the shaped compact, followed by a second heating step at a second temperature sufficient to densify the shaped compact.

14. A method according to claim 1, wherein said coagulated network is formed by:
dispersing the ceramic particles in water at a pH that produces a net surface charge, to form a dispersed slurry;
ultrasonicating the slurry to break apart agglomerates;
sedimenting the slurry to separate remaining strong agglomerates and inclusions;
siphoning off supernatant containing desired colloidal particles; and
adding a sufficient amount of salt to the supernatant to form a coagulated network.

15. A method according to claim 1, wherein said coagulated network of ceramic powder particles in water comprises at least two different types of ceramic powder particles.

16. A method according to claim 15, wherein said coagulated network is formed by:
mixing each ceramic powder separately with water at a pH that produces a net surface charge with that powder, to form a plurality of dispersed slurries;
combining said plurality of dispersed slurries to form a mixed slurry; and
adding a sufficient amount of salt to the mixed slurry to cause particles within the slurry to form a coagulated network.

17. A method according to claim 15, wherein said coagulated network is formed by:
mixing each ceramic powder separately with water at a pH that produces a net surface charge with that powder, to form a plurality of dispersed slurries;
adding a sufficient amount of salt to each of said plurality of dispersed slurries to cause particles within each slurry to form a coagulated network, thereby forming a plurality of coagulated slurries; and
combining said plurality of coagulated slurries at a high shear rate sufficient to break apart said coagulated networks and form a new coagulated network.

* * * * *

UNITED STATES PATENT AND TRADEMARK OFFICE
CERTIFICATE OF CORRECTION

PATENT NO. : 5,188,780
DATED : Feb. 23, 1993
INVENTOR(S) : Lange et al.

It is certified that error appears in the above-identified patent and that said Letters Patent is hereby corrected as shown below:

Col. 5, line 12, delete "$Al_2O_3$slurry" and insert --$Al_2O_3$ slurry--.

Col. 9, line 20, delete "t" and insert --to--.

Col. 11, line 58, delete "3" and insert --30--.

Col. 12, line 14, delete "wa" and insert --was--.

Col. 12, line 15, insert --%-- between "Vol." and "Dow".

Col. 14, line 56, insert --slurry-- between "dispersed" and "to".

Signed and Sealed this

Twenty-eighth Day of December, 1993

Attest:

BRUCE LEHMAN

*Attesting Officer*  *Commissioner of Patents and Trademarks*